No. 696,790.  
H. C. ATKINSON.  
DINNER PAIL.  
(Application filed May 25, 1901.)  
Patented Apr. 1, 1902.

(No Model.) 2 Sheets—Sheet 1.

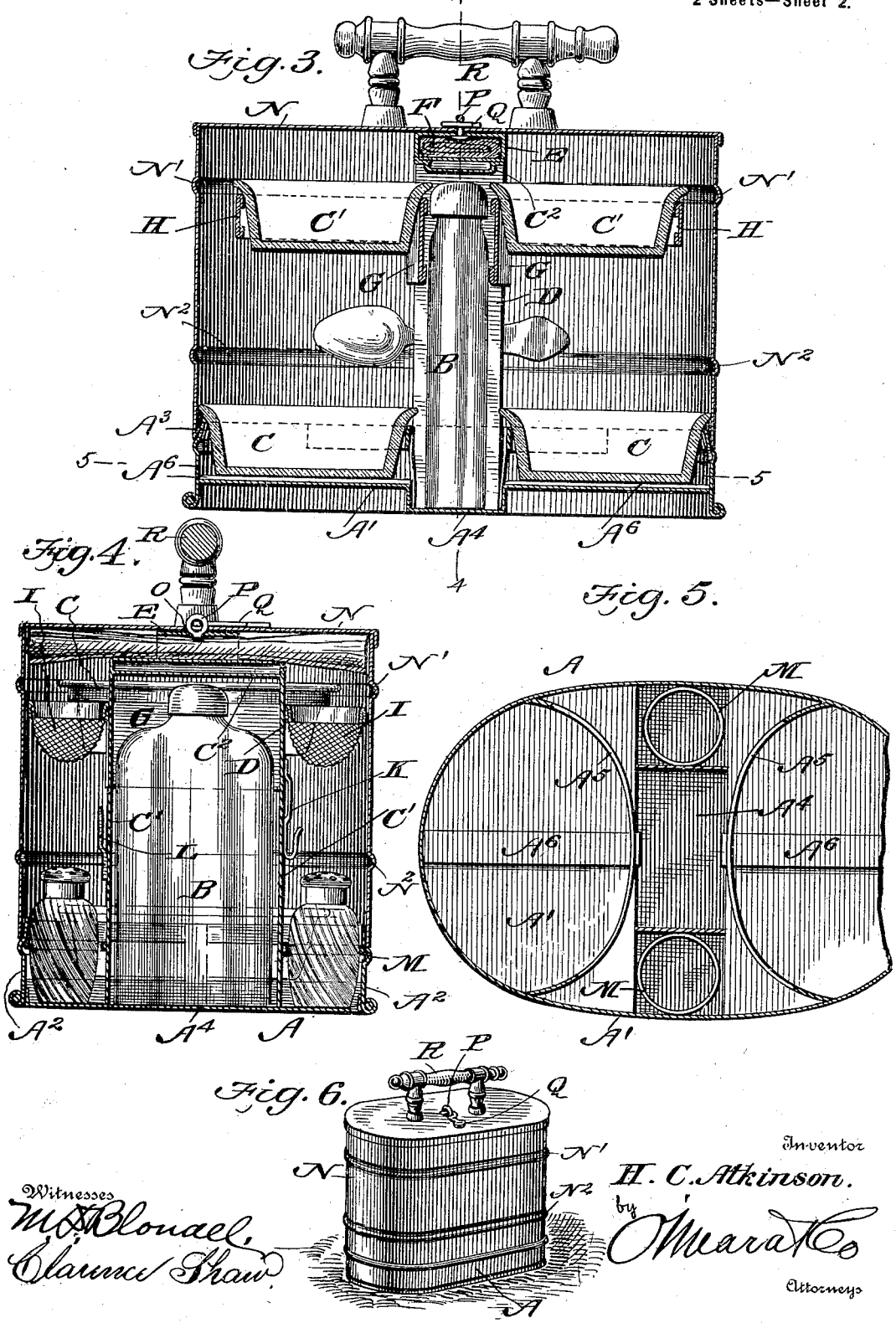

UNITED STATES PATENT OFFICE.

HENRY CATE ATKINSON, OF LOUISVILLE, KENTUCKY, ASSIGNOR OF ONE-HALF TO WILLIAM MILLER, OF LOUISVILLE, KENTUCKY.

DINNER-PAIL.

SPECIFICATION forming part of Letters Patent No. 696,790, dated April 1, 1902.

Application filed May 25, 1901. Serial No. 61,900. (No model.)

*To all whom it may concern:*

Be it known that I, HENRY CATE ATKINSON, a citizen of the United States, residing at Louisville, in the county of Jefferson and State of Kentucky, have invented a new and useful Dinner-Pail, of which the following is a specification.

This invention is an improved dinner-pail, the leading features of which are simplicity, neatness, compactness, cleanliness, and inexpensiveness of equipment.

Dinner-pails and lunch-kits as commonly constructed are clumsy and cumbersome devices containing a number of variously-shaped receptacles for holding the food and drink, and as these receptacles must be specially made for their respective pails the cost of the article as a whole is considerable. Furthermore, the food and drink are usually placed in metallic receptacles which are difficult to clean, and another objection to dinner-pails as usually constructed is that the receptacles are not easily accessible—that is, it is often necessary to remove all the receptacles before one can lunch.

The object of my invention is to avoid all these defects and produce a dinner-pail in which ordinary dishes or receptacles can be arranged and carried and one in which all the dishes can be exposed without removing anything but the cover.

Another object is to provide a dinner-pail in which the knife, fork, and spoon can be carried within the pail and also one in which provision shall be made for carrying eggs, a napkin, and pepper and salt cruets all within the pail.

With these objects in view my invention consists, essentially, of a base arranged to hold a bottle, two dishes, and the pepper and salt cruets, a support arranged upon the base and carrying two hinged dish-holders adjacent to its upper end, the napkin-holder being arranged upon the top, the egg, knife, fork, and spoon holders arranged upon the ends of said support, and a cover adapted to be fitted over the said support and closed and secured, said cover being provided with a handle by means of which the pail is carried.

The invention consists also in certain details of construction and also in the novel manner of combining said details, all of which will be fully set forth in the description and specified in the claims.

Figure 1:
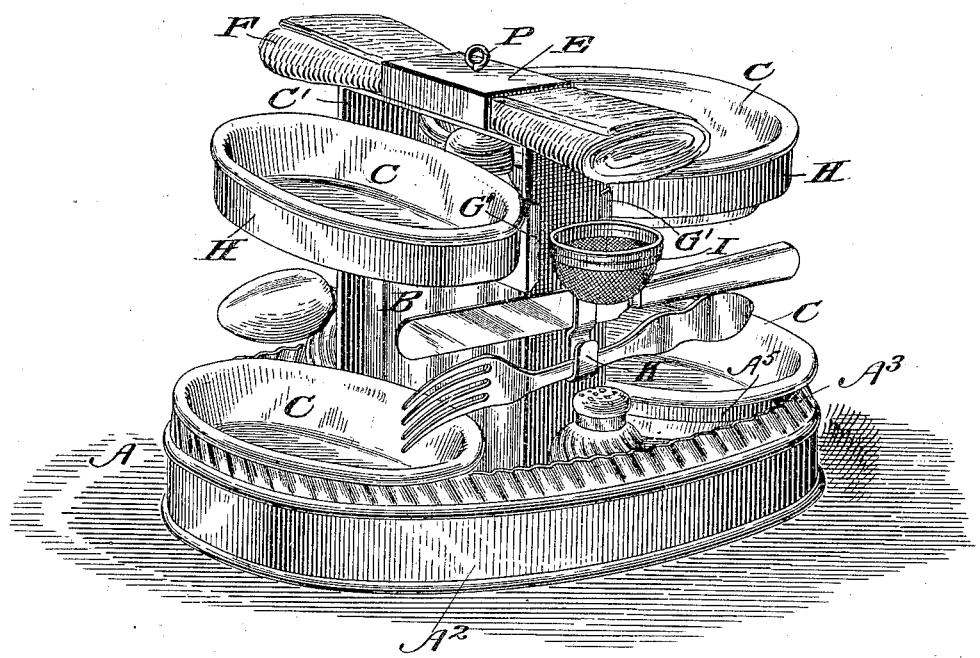
Figure 2:
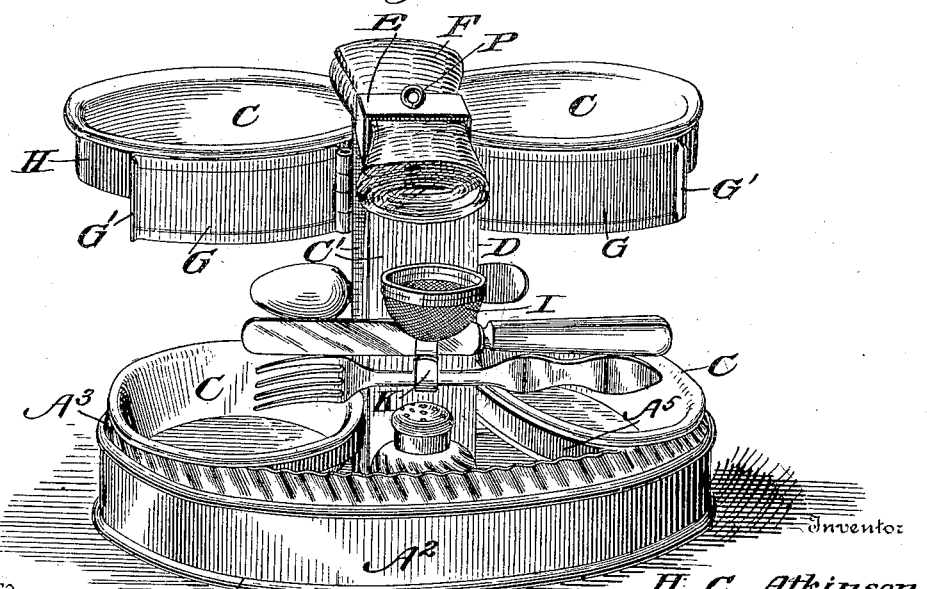

In the drawings forming part of this specification, Figure 1 is a perspective view of a device constructed in accordance with my invention, the cover being removed. Fig. 2 is a similar view, the hinged sections of the support being thrown back to expose the lower dishes. Fig. 3 is a vertical longitudinal section of the dinner-pail complete, the cover being secured in place. Fig. 4 is a section on the line 4 4 of Fig. 3. Fig. 5 is a sectional plan on the line 5 5 of Fig. 3, and Fig. 6 is a perspective view showing the cover secured and illustrating the general appearance of the dinner-pail ready for transportation.

In carrying out my invention I employ a base A, which may be of any shape desired; but in practice I prefer to make the same either round or oval, said base comprising a bottom A' and sides $A^2$, the upper edges of which are crimped, as shown at $A^3$, and bent slightly inward to facilitate the fitting of the top or cover upon the base. The bottom A' has a central depression $A^4$, which is adapted to receive a bottle B intended to hold coffee, tea, milk, or other liquid.

Curved bars $A^5$ are attached to the side of the base upon opposite sides of the central depression, forming in connection with the curved ends of the base suitable racks or holders for receiving and holding dishes or receptacles, said curved bars being braced and strengthened by means of bars $A^6$. The curved bars $A^5$, in connection with the ends of the base, form, essentially, oval-shaped holders, and is thereby specially adapted to receive the ordinary oval-shaped china dishes now in use and commonly known as "side dishes," two such dishes being represented in the drawings, as shown at C.

A central support D is arranged upon the base, said support comprising the upright side pieces C' and connecting top piece $C^2$, said side and top pieces being preferably constructed of stout tin soldered at the bottom to the base and within the central depression. A napkin-holder E is arranged upon the top of the support, being essentially an open-ended box securely fastened upon the crosspiece C², the napkin F being compactly folded and passed through the said holder, as most clearly shown.

Plates G are hinged to the opposite sides of one of the uprights adjacent to its upper ends, said plates having the holder-rings H rigidly attached thereto and adapted to receive dishes C, similar in shape to those already described, and the free end of each plate G is formed with a spring-lip G', which is adapted to engage the opposing upright and fasten the plate thereto by friction or spring contact, as most clearly shown in Fig. 1. As before stated, the plates G are attached to the opposite edges of one upright adjacent to its upper end, and, if desired, similar plates may be attached to the other upright about midway its height, and in such construction it will of course be understood that the hinges being oppositely disposed the plates and their holders would swing in opposite directions. For clearness of illustration, however, I have only shown one set of plates G and holders H connected thereto.

The bottle B, heretofore referred to as resting in the central depression A⁴, is also located between the uprights C', and when the plates G are fastened in place the bottle will of course be securely held in position and tipping or tilting of the said bottle rendered impossible.

Hemispherical receptacles I are arranged upon the exterior of each upright and are intended to receive hard-boiled eggs, and below one receptacle on one side is arranged a combined knife and fork rack K, while upon the other upright is arranged the spoon-rack L, and adjacent to the lower end of each upright and between the said end and the base are arranged the rings M for holding the salt and pepper cruets, said cruets resting also in the central depression of the bottom.

The cover N is closed at the top, open at the bottom, and is of such shape, size, and depth as to completely cover all of the various appliances herein described, the lower edge of the cover fitting snugly upon the crimped edge of the base and resting upon the bead directly below the said crimped edge. The top of the cover has an opening O, through which an eye P projects when the cover is fitted upon the base, said eye being rigidly attached to the upper portion of the support and in the present instance extends upwardly from the top of the napkin-holder.

A hook Q is pivoted upon the top of the cover adjacent to the opening O, said hook being adapted to be passed through the eye P when the cover is properly fitted, thereby securely locking the parts of the pail together, and inasmuch as the cover is provided with a handle R it will be readily understood how the pail can be easily carried, maintaining all of the various articles and dishes in their proper position. In practice I prefer to construct the top with a beading groove N' adjacent to its upper end and also with a similar groove N² adjacent to its lower end, said grooves imparting great strength and rigidity to the cover.

It will thus be seen that I provide an exceedingly simple construction of dinner-pail consisting only of a base, a central support, and a cover, the base and support receiving and holding all the necessary equipment and the cover securely locking the parts in position.

In use the bottle is inserted in the central depression of the bottom between the uprights, the salt and pepper cruets introduced into their holders, and the two lower dishes inserted in their racks. The knife and fork are then introduced and likewise the spoon. The upper dishes are then arranged in their holders and the plates G locked in engagement with the upright. The napkin can then be inserted in its holder, and the cover is then placed over the support, resting upon the base, the eye projecting through the hole in the top, and by turning the hook through the said eye the cover is securely locked and the pail can be carried by the handle.

When it is desired to use the pail for lunching, the hook is thrown back, the cover removed, and the hinged dish-holders thrown back to the position shown in Fig. 2, thereby exposing the lower dishes and facilitating the removal of food therefrom.

The simplicity and compactness of my device will be apparent to every one, and it will also be noted that I am enabled to use ordinary dishes or receptacles now in common use, thereby avoiding the employment of specially-designed receptacles, and it will also be apparent that it will be an exceedingly easy matter to cleanse each and every dish or receptacle employed in connection with my improved construction of dinner-pail.

While I prefer to construct the base, support, and cover of tin, and also prefer to use ordinary china dishes, it will of course be understood that the base, support, and cover can be made of papier-mâché or other suitable material and that porcelain-lined or granite-ware receptacles can be used within the pail. It will also be understood that my invention is susceptible of certain changes or modifications without departing from the broad principles thereof.

Having thus fully described my invention, what I claim as new, and desire to secure by Letters Patent, is—

1. A dinner-pail comprising a base, having a support arranged thereon, said support having one or more hinged sections, and a cover adapted to be fitted over the support and to be fastened thereto, substantially as described.

2. A dinner-pail comprising a base having a support arranged thereon, said support having one or more hinged sections, and a cover fitted over the support and adapted to be fastened to the top of said support, substantially as described.

3. A dinner-pail comprising a base, a support adapted to receive a vessel or receptacle therein, and also having hinged sections, the top of said support having a napkin-holder arranged thereon, and a cover adapted to fit over the base and support and provided with means for attaching the top to the support, substantially as described.

4. A dinner-pail comprising a base having one or more receptacle-holders arranged thereon, a support arranged upon the base and adapted to receive and hold a vessel or receptacle, said support having hinged sections carrying holders, and a cover fitting upon the base over the support and provided with fastening means, substantially as described.

5. A dinner-pail comprising a base having holders arranged thereon, a support having hinged holders adjacent to its upper end, a napkin-holder at the top and knife, fork and spoon racks at the ends, and a cover adapted to fit over the support and rest upon the base, and means for fastening said cover, substantially as described.

6. A dinner-pail comprising a base having a central depression, said base having receptacle-holders arranged within the depression and upon opposite sides thereof, the support arranged centrally of the base and adapted to receive and hold a bottle, the hinged sections carrying holders, the egg-holders carried by the support, the knife, fork and spoon racks arranged upon the sides of the support and the napkin-holder upon the top, and the cover having a handle, said cover being adapted to fit over the support and holders and rest upon the base, and the fastening means carried by the said cover for securing the parts together, substantially as described.

HENRY CATE ATKINSON.

Witnesses:
A. M. TREFZER,
J. F. DE WITT.